United States Patent [19]

Kanazawa

[11] Patent Number: 5,796,532
[45] Date of Patent: Aug. 18, 1998

[54] BACK MIRROR AND METHOD FOR MANUFACTURING THE SAME

[75] Inventor: Toru Kanazawa, Shida-gun, Japan

[73] Assignee: Murakami Kaimeido Co., Ltd., Japan

[21] Appl. No.: 752,581

[22] Filed: Nov. 21, 1996

Related U.S. Application Data

[63] Continuation-in-part of Ser. No. 495,854, Jun. 28, 1995.

[30] Foreign Application Priority Data

Jul. 13, 1994 [JP] Japan ................... 6-183867

[51] Int. Cl.$^6$ ............... G02B 5/10; G02B 5/08; G02B 5/02; G02B 7/182
[52] U.S. Cl. ............... 359/858; 359/859; 359/853; 359/856; 359/864; 359/866; 359/867; 359/599; 359/883; 359/838
[58] Field of Search ............... 359/858, 859, 359/853, 856, 857, 864, 866, 867, 868, 599, 883, 838

[56] References Cited

PUBLICATIONS

Japan Published Patent Application, 102415/1994.

*Primary Examiner*—Paul M. Dzierzynski
*Assistant Examiner*—Mohammad Y. Sikder
*Attorney, Agent, or Firm*—Hedman, Gibson & Costigan, P.C.

[57] ABSTRACT

A back mirror has plural mirror surface areas of different curvatures disposed side by side or plural mirror surface areas disposed side by side to form discontinuous planes. The back mirror includes a dividing line having a light diffusion effect formed along a border portion of the plural mirror surface areas. The dividing line may be formed by projections and depressions having a light diffusion effect which are formed on at least one of a transparent substrate, reflecting film and a transparent thin film formed on the reflecting film.

5 Claims, 5 Drawing Sheets

BACK MIRROR AND METHOD FOR MANUFACTURING THE SAME

This invention is a continuation-in-part of application Ser. No. 08/495,854 filed on Jun. 28, 1995.

BACKGROUND OF THE INVENTION

This invention relates to a back mirror capable of having an enlarged visual field by disposing mirror surface areas of different curvatures side by side or disposing mirror surfaces side by side so as to constitute discontinuous planes and, more particularly, to a back mirror of this type in which a border portion of the mirror surface areas can be recognized easily at night. The invention relates also to a method for manufacturing such glass.

A back mirror of a vehicle which is generally made in a convex mirror surface of a constant radius of curvature or in a flat mirror surface has the disadvantage that its visual field is so narrow that it has the dead angle. The visual field can be broadened by reducing the radius of curvature of the mirror surface but this reduces the image magnification and, as a result, it becomes difficult to accurately recognize the distance of the image.

As a back mirror which has a broader visual field and facilitates recognition of distance of the image, there has been proposed a back mirror which has mirror surface areas of different curvature disposed side by side or has mirror surface areas disposed side by side so as to constitute discontinuous planes.

For example, a back mirror disclosed in Japanese Utility Model Publication No. Sho 40-6148 is shown in FIG. 2. The mirror surface of this back mirror 10 is composed of plural mirror surface areas 12 having different curvatures and disposed side by side. For another example, a back mirror disclosed in Japanese Utility Model Publication No. Sho 62-118750 is shown in FIG. 3. The mirror surface of this back mirror 22 is composed of plural mirror surface areas 24 and 26 having different radiuses of curvature from each other and disposed side by side. FIGS. 4A to 4D show an example of a back mirror which has been manufactured in the past. In this back mirror 28, the radius of curvature is gradually changed. The mirror surface of this back mirror 28 has a mirror surface area 30 (a spherical surface) having a constant radius of curvature and a mirror surface area 32 (a non-spherical surface) having a gradually changing radius of curvature.

In the prior art back mirror having plural mirror surface areas, it will be dangerous unless a particular mirror surface area is easily recognized at night as a mirror surface from which an image reflected on the back mirror comes. For this reason, it is necessary to form a dividing line indicating division of the mirror surface areas along the border of the mirror surface areas. In the example of FIG. 2, for example, dividing lines 18 to 21 are drawn with a noctilucent paint. There is however the problem in this prior art back mirror that the dividing lines 18 to 21 become hard to see with lapse of time due to coming off or deterioration of the noctilucent paint. In the example of FIG. 3, dividing lines 34 and 36 are formed by printing. These dividing lines 34 and 36 however are difficult to see at night. In the example of FIGS. 4A to 4D, a dividing line 38 is formed, as shown in FIGS. 4C to 4D, by cutting off a part of a reflecting film 42 formed on the front or back surface of a glass substrate 40 along the border of the mirror surface areas 30 and 32. In this example also, it is difficult to see the dividing line 38 at night. Besides, the width of the dividing line 38 is so small that when a driver focuses his eyes on the rear view to look at the rear view through this back mirror 28, the dividing line 38 becomes dim and hard to see. Moreover, in case an aluminum film is used as the reflecting film 42, a portion adjacent to the dividing line 38 is eroded due to high heat generated by cutting off of the portion for the dividing line 38 and back coating cannot prevent such erosion.

It is, therefore, an object of the present invention to provide a back mirror according to which a driver can easily recognize a border portion between mirror surface areas at night and a method for manufacturing such back mirror.

SUMMARY OF THE INVENTION

For achieving the object of the invention, there is provided a back mirror having plural mirror surface areas of different curvatures disposed side by side or plural mirror surface areas disposed side by side to form discontinuous planes, said back mirror having a dividing line formed along a border portion between the plural mirror surface areas, wherein said back mirror has a transparent glass substrate having a front surface and a back surface, and a refleing film on said back surface of the transparent glass substrate, said dividing line comprising fine projections and depressions on the back surface of the transparent glass substrate, whereby the fine projections and depressions constituting the dividing line diffuse and reflect incident light entering from the front surface of the transparent glass substrate thereby to cause the diffused and reflected light to pass through the front surface of the transparent glass substrate to an eyepoint of a driver and cause the driver to recognize the dividing line.

According to the invention, the dividing line is formed by forming fine projections and depressions on the back surface of the transparent glass substrate and, therefore, the dividing line glistens at night with the fine projections and depressions diffusing and reflecting head light of a vehicle running in the rear or street light thereby causing the diffused and reflected light to pass to an eyepoint of a driver and causing the driver to easily recognize the dividing line. Accordingly, a border portion between mirror surface areas can be easily recognized and safety in driving can thereby be ensured. Further, since the dividing line is formed by the fine projections and depressions, there is no coming off or deterioration of the dividing line as in the case of the noctilucent paint so that the dividing line can be used for a long time. Further, since the fine projections and depressions are formed on the back surface of the transparent glass substrate, the dividing line can be kept clean and, therefore, deterioration in the light diffusion effect can be prevented.

In one aspect of the invention, by forming the reflecting film on the entire back surface of the transparent glass substrate and covering said dividing line with the reflecting film, it becomes unnecessary to cut off the reflecting film along the dividing line whereby corrosion of the reflecting film at the cut portion can be prevented.

In another aspect of the invention, by cutting off the reflecting film along the dividing line and coating the reflecting film continuously with a back coating on the back surface of the reflecting film in a portion including the dividing line and an area in the vicinity of the dividing line, the dividing line is covered with the back coating and, therefore, deposition of dust on the projections and depressions can be prevented and the dividing line can thereby be kept clean and the function of the dividing line can be maintained semipermanently. Further, cut portions of the reflecting film in the direction of the width of the dividing line are covered with the back coating and, therefore, corrosion of the cut portions can be prevented. Besides, by selecting a coating material of a conspicuous color as the back coating, the dividing line can be made conspicuous even during daytime.

According to this aspect of the invention, since the dividing line is a relatively thick one having the width of 0.5 mm or over, the dividing line can be clearly recognized when the driver look at the rear view, even if the dividing line becomes dim. Also, since the width of the dividing line is 2 mm or less, the dividing line does not cause difficulty in the driver's seeing the rear view.

In still another aspect of the invention, there is provided a method for manufacturing a back mirror having a dividing line formed with projections and depressions and having a light diffusion effect, said method comprising a step of forming the projections and depressions by blasting.

According to this method, since the projections and depressions are formed by blasting according to which a surface is ground by causing small beads or the like material to collide with the surface, a uniform light diffusion effect can be obtained.

Preferred embodiments of the invention will be described below with reference to the accompanying drawings.

BRIEF DESCRIPTION OF THE DRAWINGS

In the accompanying drawings,

FIGS. 1A and 1B are views showing an embodiment of the invention in which FIG. 1A is a front view and FIG. 1B is a view taken along lines I—I in FIG. 1A;

FIGS. 4A, 4B, 4C and 4D are views showing another prior art back mirror in which FIG. 4A is a front view, Fig. 4B is a sectional view taken along lines II—II in FIG. 4A.

FIG. 4C is a partly enlarged sectional view, FIG. 4D is a partly enlarged sectional view;

DESCRIPTION OF PREFERRED EMBODIMENTS

Figure 1A:
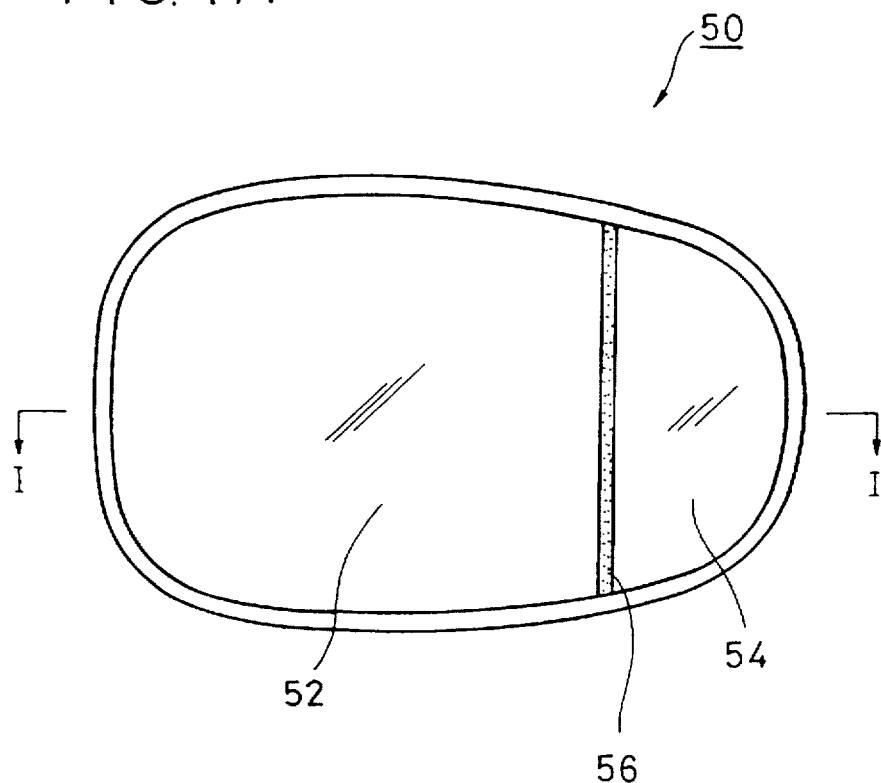
Figure 1B:
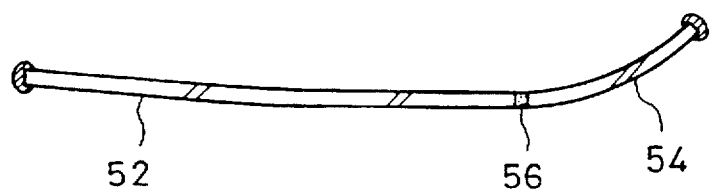
Figure 2:
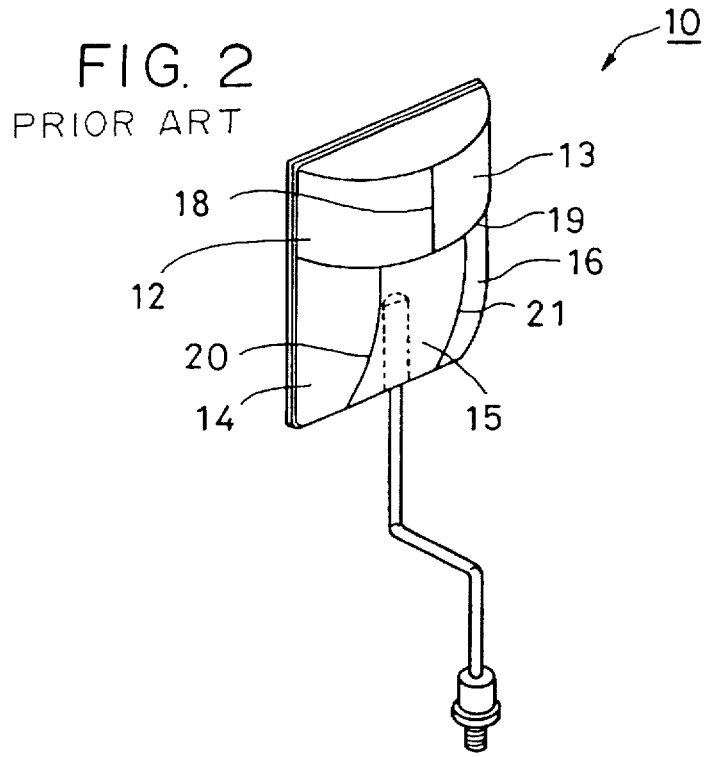
FIG. 2 is a perspective view showing a prior art back mirror.
Figure 3:
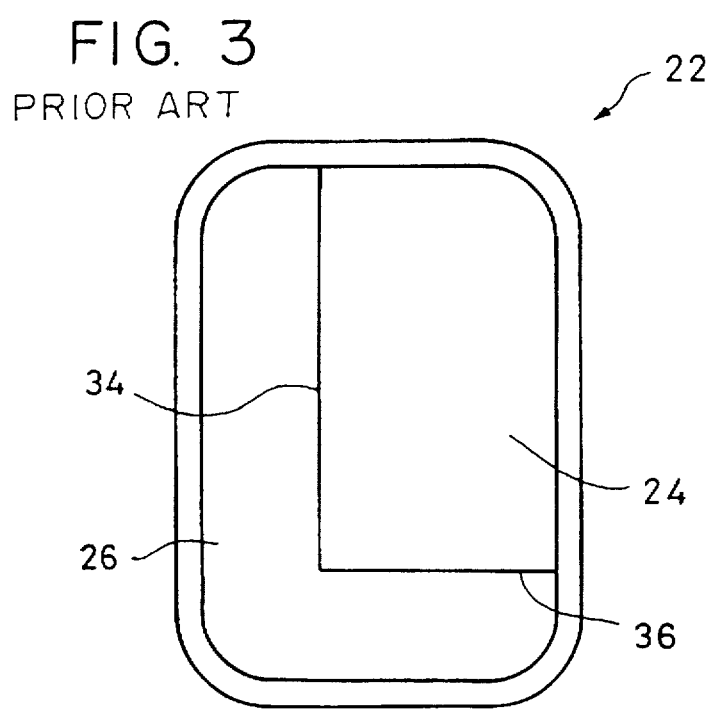
FIG. 3 is a front view showing another prior art back mirror.
Figure 4A:
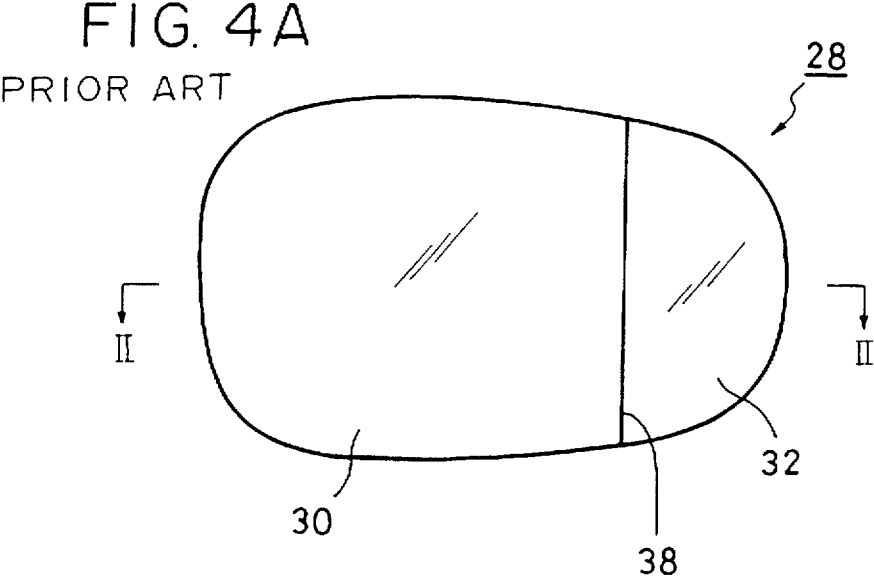
Figure 4B:
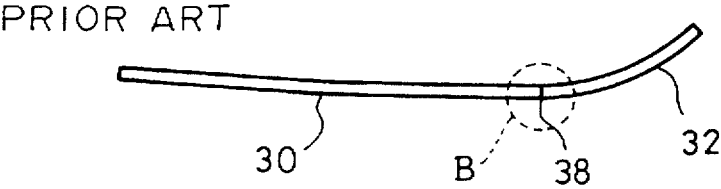
Figure 4C:
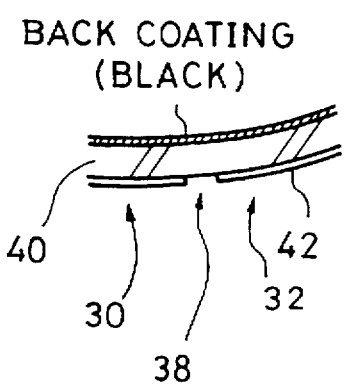
Figure 4D:
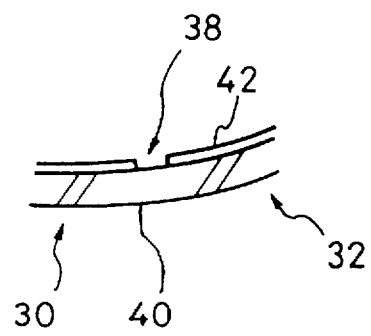

Figs. 1A and 1B show an embodiment of the invention. The figures show only a mirror portion. A back mirror 50 is of a mirror in which the radius of curvature changes gradually and is formed as a right side outer mirror (e.g., a door mirror or a fender mirror). The invention of course is applicable to other back mirrors. The mirror surface of the back mirror 50 consists of a mirror surface area 52 (a spherical surface) having a constant radius of curvature and a mirror surface 54 having a gradually changing radius of curvature (a gradually changing area or a non-spherical area) disposed side by side. A dividing line 56 having a light diffusion effect is formed in a border portion between the mirror surface areas 52 and 54.

According to this back mirror 50, a normal rear view can be seen by the mirror surface area 52 and a right side view of the vehicle can be seen by the mirror surface area 54. Since the dividing line 56 has a light diffusion effect, the dividing line 56 glistens against the head light of a vehicle running in the rear or street light at night and, therefore, the two areas 52 and 54 can be distinguished easily from each other.

Figure 5:
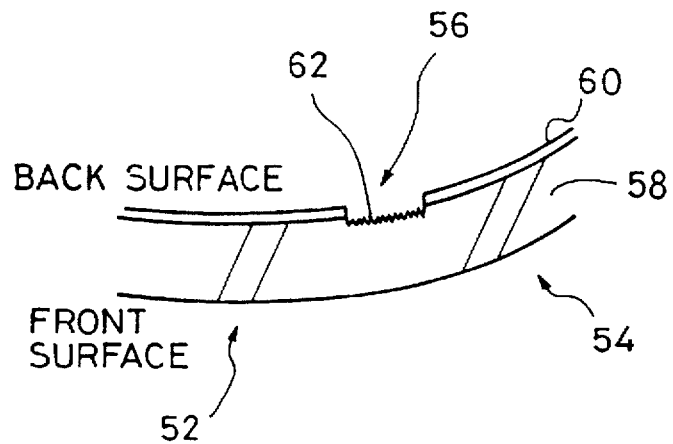
FIG. 5 is a partly enlarged sectional view showing specific example of the structure of a dividing line in FIG. 1.

A specific example of the structure of the dividing line 56 is shown in FIG. 5. A mirror surface is formed by forming a reflecting surface 60 made of chromium or aluminum on the rear surface of a glass substrate 58 by sputtering or vapor deposition. After forming the reflecting film 60, the reflecting film 60 is cut off in a portion where the dividing line 56 is to be formed. Alternatively, the reflecting film 60 may be originally formed excluding a portion where the dividing line 58 is to be formed. Then, the exposed portion of the rear surface of the glass substrate 58 is ground uniformly by blasting, e.g., by causing fine beads to collide on the exposed glass substrate portion, whereby fine projections and depressions 62 are formed on the exposed rear surface of the glass substrate 58. Thus, a uniform light diffusion effect over the entire dividing line 62 can be obtained. As the fine beads, beads of aluminum, silicon, iron or glass may be employed. The fine beads should preferably have a diameter within a range between several microns and several hundred microns.

For obtaining an excellent light diffusion effect, the distance between the peak and bottom of the projections and depressions 62 should preferably be within a range between several microns and several hundred microns. By setting the width of the dividing line 56 within a range between 0.5 mm and 2.0 mm, the dividing line 56 can be clearly recognized when the driver sees the rear view and, in this case, the dividing line 56 does not become an obstacle in seeing the rear view. The entire processing including cutting off of the reflecting film 60 and forming of the projections and depressions 62 on the glass substrate 58 may be made continuously by a series of blasting processes. Even if the reflecting film 60 is formed by an aluminum film, erosion which generally occurs in cutting off the film will not occur because the reflecting film 60 is ground by physical collision of beads used in the blasting process without generating a high heat.

Figure 6:
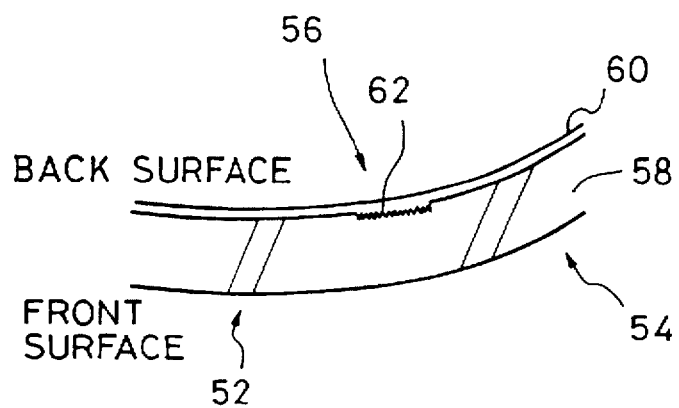
FIG. 6 is a partly enlarged sectional view showing other example of the structure of the dividing line 56 FIG. 1.

Another example of the dividing line 56 is shown in FIG. 6. This is also of a type in which a mirror surface is formed by forming a reflecting film 60 made of chromium or aluminum on the rear surface of a glass substrate 58 by sputtering or vapor deposition. Before forming the reflecting film 60, projections and depressions 62 are formed by blasting on the rear surface of the glass substrate 58 in a portion where the dividing line 56 is to be formed. Then, the reflecting film 60 is formed on the entire rear surface of the glass substrate 58. According to this processing, cutting of the reflecting film 60 is obviated so that occurrence of erosion along the cut off portion can be prevented.

Figure 7:
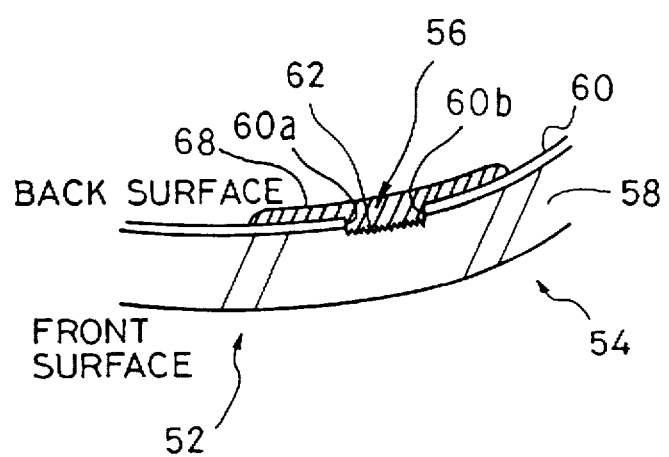
FIG. 7 is a partly enlarged sectional view showing other example of the structure of the dividing line 56 FIG. 1.

Another example of the structure of the dividing line 56 is shown in FIG. 7. This is a modified structure of the one shown in FIG. 5 in which the back surface of the mirror is coated with a back coating 68 from the upper end portion to the lower end portion along the dividing line 56 so that the dividing line 56 is coated with the back coating 68 to shield it from the outside air. The back coating 68 is coated with a width which is larger than the width of the dividing line 56 to cover the entire dividing line 56. A coating of any desired color may be used as the back coating 68.

According to this arrangement, the dividing line 56 is covered with the back coating 68 and, therefore, deposition of dust on the projections and depressions 62 can be prevented and the dividing line 56 can thereby be kept clean and the function of the dividing line can be maintained semipermanently. Further, cut portions 60a and 60b of the reflecting film 60 in the direction of the width of the dividing line 56 are covered with the back coating 68 and, therefore, corrosion of the cut portions 60a and 60b can be prevented. Besides, by selecting a coating material of a conspicuous color as the back coating 68, the dividing line 56 can be made conspicuous even during daytime. In addition, notwithstanding that the projections and depressions 62 constituting the dividing line 56 are covered with the back coating 68, the projections and depressions 62 still have the light diffusion effect, glistening against head light of a vehicle running in the rear or street light at night and thereby enabling the mirror surface areas 52 and 54 to be distinguished easily from each other. The back coating 68 may be applied not only in a portion in the vicinity of the dividing line 56 but also on the entire back surface of the mirror to cover the entire reflecting film 60.

In the above described embodiments, the projections and depressions 62 are formed by blasting. The projections and depressions 62 may also be formed by other methods such, for example, as projection of laser beam and stamping using a die having projections and depressions.

In the above described embodiments, the dividing line 56 is formed in the form of a solid line (i.e., a continuous line). Alternatively, the dividing line 56 may be formed with a dotted line or other type of line. It is only essential that the dividing line should distinguish the border between adjacent mirror surface areas. In the above described embodiments, adjacent mirror surface areas have different curvatures. The invention is applicable also to a case where a mirror surface is divided into adjacent areas which have the same curvature but constitute discontinuous planes (i.e. constituting an angle between the adjacent areas). The number of mirror surface areas is not limited to two but it may be three or more. The invention is applicable not only to an outer mirror but also to an inner mirror.

What is claimed is:

1. A back mirror having plural mirror surface areas of different curvatures disposed side by side to form discontinuous planes, said back mirror having a dividing line formed along a border portion between the plural mirror surface areas, wherein said back mirror has a transparent glass substrate having a front surface and a back surface, and a reflecting film on said back surface of the transparent glass substrate, said dividing line comprising fine projections and depressions formed on the back surface of the transparent glass substrate, whereby the fine projections and depressions constituting the dividing line diffuse and reflect incident light entering from the front surface of the transparent glass substrate thereby to cause the diffused and reflected light to pass through the front surface of the transparent glass substrate to an eyepoint of a driver and cause the driver to recognize the dividing line.

2. A back mirror as defined in claim 1 wherein said reflecting film is formed on the entire back surface of the transparent glass substrate and said dividing line is covered with the reflecting film.

3. A back mirror as defined in claim 1 wherein the reflecting film is cut off along the dividing line and the reflecting film is continuously coated with a back coating on the back surface of the reflecting film in a portion including the dividing line and an area in the vicinity of the dividing line.

4. A back mirror as defined in claim 1 wherein the width of the dividing line is within a range between 0.5 mm and 2 mm.

5. A method for manufacturing a back mirror having plural mirror surface areas of different curvatures disposed side by side to form discontinuous planes, said back mirror having a dividing line formed along a border portion between the plural mirror surface areas, wherein said back mirror has a transparent glass substrate having a front surface and a back surface, and a reflecting film on said back surface of the transparent glass substrate, said dividing line comprising fine projections and depressions formed on the back surface of the transparent glass substrate, whereby the fine projections and depressions constituting the dividing line diffuse and reflect incident light entering from the front surface of the transparent glass substrate thereby to cause the diffused and reflected light to pass through the front surface of the transparent glass substrate to an eyepoint of a driver and cause the driver to recognize the dividing line, said method comprising a step of forming the projections and depressions by blasting.

* * * * *